United States Patent [19]

Delisle, Jr. et al.

[11] Patent Number: 5,023,608
[45] Date of Patent: Jun. 11, 1991

[54] FUEL FILLER ALARM FOR BOATS

[75] Inventors: Robert L. Delisle, Jr., 8 Landover Dr., East Greenwich, R.I. 02818; Douglas J. Goss, North Kingstown, R.I.

[73] Assignee: Robert L. Delisle, Jr.

[21] Appl. No.: 315,132

[22] Filed: Feb. 24, 1989

[51] Int. Cl.⁵ .............................. G08B 3/00
[52] U.S. Cl. .................... 340/984; 116/109; 116/112; 340/450.2; 340/406
[58] Field of Search ............... 340/984, 406, 608, 450, 340/450.2; 116/109, 112, 108, 137 R; 114/270

[56] References Cited

U.S. PATENT DOCUMENTS

| | | | |
|---|---|---|---|
| 2,088,058 | 7/1937 | Hensler | 177/311 |
| 2,309,804 | 2/1943 | Smith | 116/109 |
| 2,360,338 | 10/1944 | Hammand | 116/109 |
| 2,549,300 | 4/1951 | Ellingson | 137/102 |
| 2,679,641 | 5/1954 | Liles | 116/109 |
| 2,681,031 | 6/1954 | McGillis et al. | 116/112 |
| 2,831,452 | 4/1958 | Haynes | 116/112 |
| 2,905,137 | 9/1959 | Milnes | 116/112 |
| 2,910,956 | 11/1959 | Scully | 116/112 |
| 2,964,009 | 12/1960 | Rudolf | 116/112 |
| 2,972,362 | 2/1961 | Gardner | 116/109 |
| 3,385,257 | 5/1968 | Madsen | 116/109 |
| 3,857,350 | 12/1974 | Rohan | 116/112 |
| 4,445,591 | 5/1985 | Mitchell | 182/92 |

Primary Examiner—Joseph A. Orsino
Assistant Examiner—Brent A. Swarthout
Attorney, Agent, or Firm—Salter & Michaelson

[57] ABSTRACT

A fuel filler alarm for boats includes a housing, a whistle element on the housing and a suction ring on the housing. The suction ring is operable for detachably securing the housing to the hull of a boat adjacent a fuel tank vent thereon so that air passing outwardly through the vent passes through the housing and the whistle element. The whistle element is responsive to the outward flow of air through the fuel tank vent during a fuel filling operation for producing an audible whistling sound, while sound essentially stops when the associated fuel tank reaches a substantially full condition.

7 Claims, 2 Drawing Sheets

FUEL FILLER ALARM FOR BOATS

BACKGROUND AND SUMMARY OF THE INVENTION

The instant invention relates to boats, and more particularly to a fuel filler alarm which is operative during a fuel filling operation for indicating when a fuel tank of a boat is in a substantially full condition.

It has generally been found that substantial quantities of fuel, including both gasoline and diesel fuel, are often spilled during boat fueling operations. Specifically, it has been found that substantial quantities of fuel are spilled through fuel tank vent lines and/or fuel filler lines due to overfilling of the fuel tanks of boats during fueling operations. It has been further found that this has not only caused substantial amounts of fuel to be wasted annually, but that it has caused serious pollution of the waters surrounding many marine fueling stations. Further, it has been found that in many instances, fuel spills, particularly gasoline spills, have represented significant fire hazards in marina areas.

In order to overcome the above problem, various alarms and signalling devices have been developed for use in connection with marine craft during fueling operations. For example, the devices disclosed in the ROHAN, U.S. Pat. No. 3,857,350 and RENNER, JR. et al, U.S. Pat. No. 3,924,559, generally address the problem of avoiding fuel spills during marine fueling operations. The devices disclosed in the HENSLER, U.S. Pat. No. 2,088,058; SMITH, U.S. Pat. No. 2,309,804; SMITH, U.S. Pat. No. 2,539,281; ELLINGSON, U.S. Pat. No. 2,549,300; McGILLIS et al, U.S. Pat. No. 2,681,031; MILNES, U.S. Pat. No. 2,905,137; SCULLY, U.S. Pat. No. 2,910,956; RUDOLF, U.S. Pat. No. 2,964,009; and HAYNES, U.S. Pat. No. 2,831,452 also generally address the problem of minimizing fuel spills during fueling operations, although they are not specifically directed to marine fueling operations. However, while the devices disclosed in the above references represent the closest prior art to the subject invention of which the applicant is aware, they fail to teach an effective fuel filler alarm which is detachably securable to the hull of a boat adjacent a fuel tank vent thereon and operative for producing an audible signal in response to the outward passage of air from the air vent during a fueling operation. For these reasons, the above references are believed to be of only general interest with respect to the subject invention.

The instant invention provides an effective fuel filler alarm for boats comprising a whistle which is operable in response to an air stream passing outwardly through a fuel tank vent on the hull of a boat during a fueling operation for producing an audible signal and mounting means for releaseably mounting the whistle on the hull of the boat so that air passing outwardly through the fuel tank vent passes through the whistle to produce an audible signal. The mounting means preferably includes a housing having an aperture therein and the whistle is preferably received and secured in the aperture. The mounting means preferably further includes securing means for releasably securing the housing to the hull of the boat adjacent the fuel tank vent so that air passing through the vent passes through the housing and outwardly through the whistle. The means for securing the housing preferably comprises an elastomeric suction ring including inner and outer seal portions and a concave suction portion between the seal portions. The suction ring is constructed so that the inner and outer seal portions are sealingly engageable with the hull of the boat to seal the suction portion from air in the interior of the housing and air on the exterior of the housing, respectively and it is resiliently deformable to evacuate air from the suction portion in order to releasably secure the suction ring to the hull of the boat in a manner similar to a suction cup. The fuel filler alarm preferably further includes a receiver which is detachably secured to the housing for receiving and containing fuel spilled from the vent during a fueling operation and a safety cord which is securable to an adjacent portion of the boat for retaining the fuel filler alarm in the event that the suction ring becomes inadvertently detached from the hull of the boat.

It has been found that the fuel filler alarm of the instant invention can be effectively utilized during a fuel filling operation for indicating when a fuel tank of a boat has reached a substantially full condition. Specifically, it has been found that by securing the suction ring of the fuel filler alarm to the hull of a boat so that the suction ring encircles a fuel tank vent on the boat hull, air exhausted from the vent during a fuel filling operation passes outwardly through the housing of the alarm and through the whistle to produce an audible sound. Accordingly, when a fuel tank associated with the vent reaches a substantially full condition so that the flow rate of the air passing outwardly through the vent is substantially reduced and the pitch or frequency level of the sound produced by the whistle is also substantially reduced to indicate that the fuel tank has reached a substantially full condition. Further, when the fuel tank reaches a full condition so that fuel begins to back up into the vent line connecting the fuel tank to the vent, the flow rate of air is reduced to a minimal level so that the whistle stops producing an audible sound to provide an indication that the fuel tank is full. As a result, in most instances the flow of fuel into the tank can be stopped before fuel overflows from the vent. Further, even if a small amount of fuel is allowed to spill through the vent it is contained in the receiver of the alarm so that it is prevented from spilling overboard.

Accordingly, it is a primary object of the instant invention to provide an effective device which is operative during a fuel filling operation for indicating when a fuel tank of a boat has reached a substantially full condition.

Another object of the instant invention is to provide an effective device for minimizing fuel spills during marine fueling operations.

An even further object of the instant invention is to provide an effective whistle device which is operative during a fuel filling operation for indicating when a fuel tank of a boat has reached a full condition.

A still further object of the instant invention is to provide an effective alarm device which is operative for indicating when a fuel tank of a boat has reached a full condition, wherein the device includes a receiver for containing a small amount of fuel which has spilled from an associated fuel tank vent.

Other objects, features and advantages of the invention shall become apparent as the description thereof proceeds when considered in connection with the accompanying illustrative drawings.

DESCRIPTION OF THE DRAWINGS

In the drawings which illustrate the best mode presently contemplated for carrying out the present invention.

DESCRIPTION OF THE INVENTION

Figure 1:
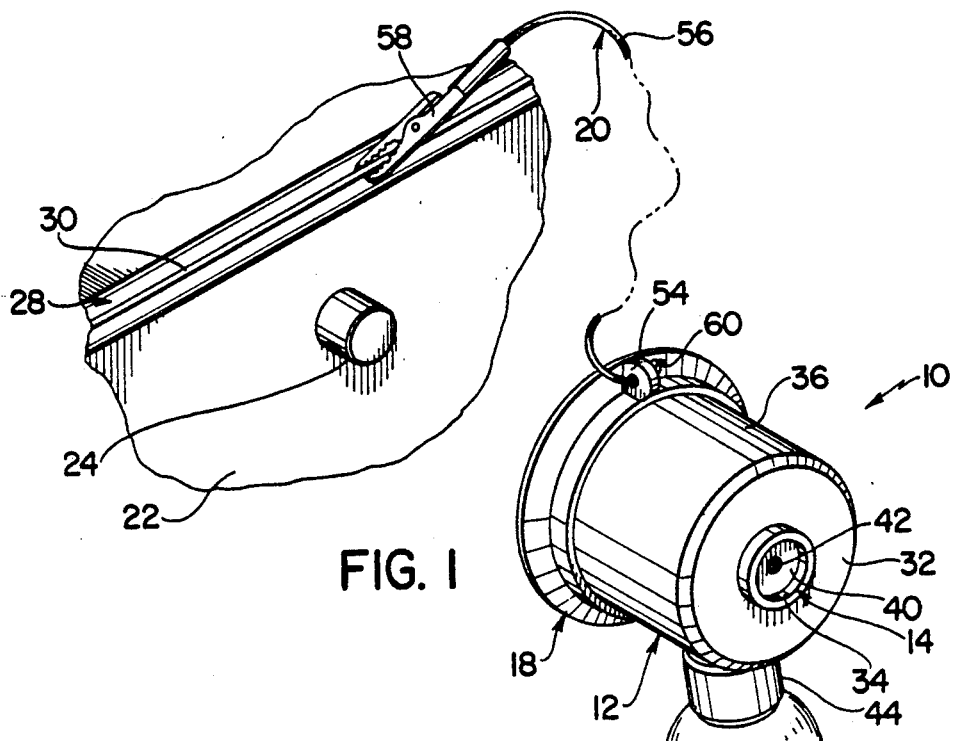
FIG. 1 is a perspective view of the fuel filler alarm of the instant invention prior to securing the suction ring thereof to the hull of a boat.

Referring now to the drawings, the fuel filler alarm of the instant invention is illustrated in FIGS. 1-4 and generally indicated at 10. The fuel filler alarm 10 includes a housing generally indicated at 12, a whistle element generally indicated at 14 on the housing 12, a receiver generally indicated at 16 on the housing 12, a suction ring generally indicated at 18 on the housing 12, and a safety cord generally indicated at 20 on the suction ring 18. The alarm 10 is securable to the hull 22 of a boat so that the suction ring 18 encircles a fuel tank vent 24 thereon so that air passing outwardly through the vent 24 during a fuel filling operation passes through the whistle element 14 to produce an audible whistling sound. When the alarm 10 is secured to the hull 22 of a boat in this manner, small amounts of fuel inadvertently passing outwardly through the vent 24 pass into the housing 12 and drain into the receiver 16 so that the fuel can be returned to the boat's fuel system without causing an environmentally damaging fuel spill.

The alarm 10 is adapted to be utilized on various different boat hulls during fueling operations. However, since the suction ring 18 relies on suction to secure the alarm 10 to a boat hull, the alarm 10 as herein embodied is preferably utilized in connection with a boat having substantially smooth outer hull surface such as the boat hull 22 illustrated in FIGS. 1-3. The vent 24 on the hull 22 is preferably of conventional configuration and it is permanently mounted on the surface of the hull 22. As illustrated in FIG. 3, the vent 24 is connected to a tubular vent line 26 which extends to a fuel tank(not shown) which is permanently mounted in the hull 22. As herein illustrated the boat comprising the hull 22 further includes a rub rail assembly generally indicated at 28 including a metal rub rail element 30 which extends along the gunwale of the boat comprising the hull 22.

The housing 12 is preferably of generally cylindrical configuration and it is preferably molded from a suitable plastic material, such as PVC. The housing 12 is substantially open at one end thereof and the opposite end thereof is defined by an end wall 32 having an aperture 34 therein. The housing 12 also includes a cylindrical sidewall portion 36 which extends forwardly from the end wall 32 and a threaded tubular nipple 38 on the sidewall portion 36 which communicates with the interior of the housing 10.

The whistle portion 14 comprises a pair of closely spaced disks 40 having reduced apertures 42 therein. The disks 40 are received and secured in the aperture 34 in end wall 32 so that the reduced apertures 42 provide communication between the interior of the housing 12 and the exterior thereof. In this regard, the disks 40 are constructed so that the amount of air normally passing outwardly through the vent 24 during a fuel filling operation is sufficient to produce a whistling sound as it passes through the apertures 42 and so that when the flow of air through the vent 24 essentially stops as fuel backs up into the vent line 26, the whistling sound essentially stops.

Figure 2:
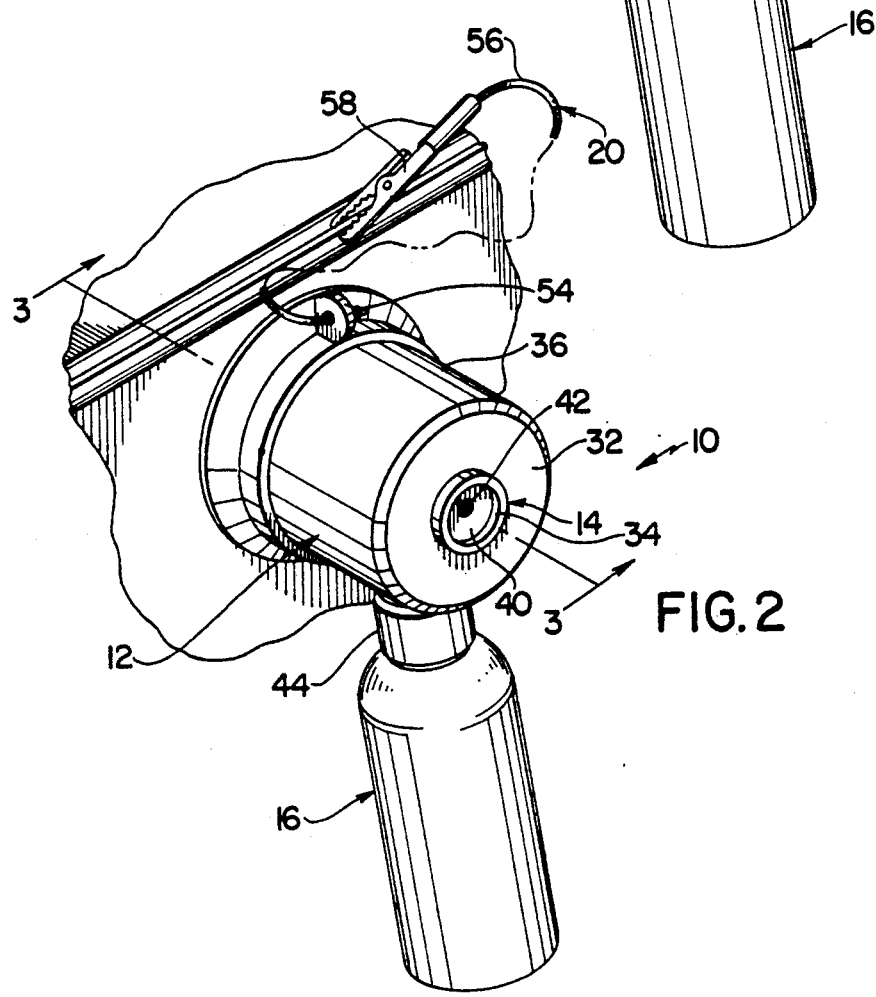
FIG. 2 is a similar view with the suction ring secured to the hull of the boat.
Figure 3:
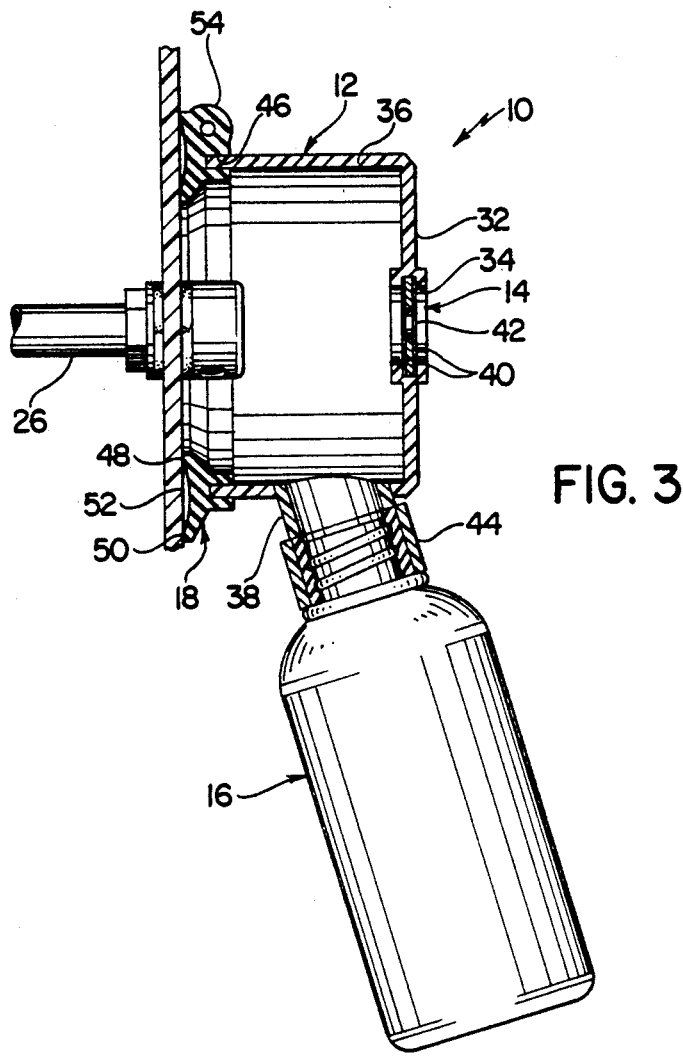
FIG. 3 is a sectional view taken along line 3—3 in FIG. 2.
Figure 4:
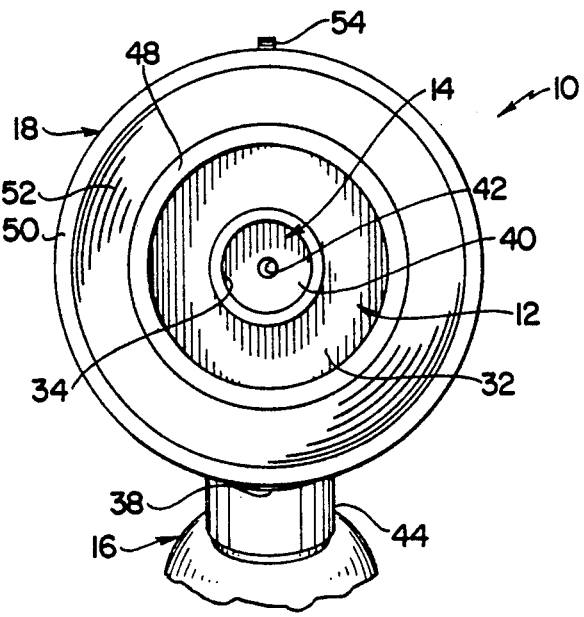
FIG. 4 is a fragmentary end view of the fuel filler alarm illustrating the suction ring.

The receiver 16 preferably comprises a bottle shaped element of the type illustrated in FIGS. 1-3 and it is preferably integrally molded from a suitable plastic material such as PVC. The receiver 16 includes a threaded neck portion 44 which is receivable on the threaded nipple 38 for releaseably securing the receiver 16 to the housing 12.

The suction ring 18 is preferably integrally molded from a suitable elastomeric material in a circular ring-like configuration and it is received on the open end of the housing 12. In this regard, the ring 18 includes a circular channel 46 and the free end portion of the side wall portion 36 is received and preferably adhesively secured in the channel 46 for sealingly securing the suction ring 18 to the housing 12. The suction ring 18 further includes a circular face comprising circular inner and outer seal portions 48 and 50, respectively and a circular concave suction portion 52 between the inner and outer seal portions 48 and 50. The suction ring 18 is resiliently deformable by urging it against a substantially flat surface in order to evacuate air from the seal portion 52 so that the seal ring 18 is operable in a manner similar to a conventional suction cup for securing the alarm 10 to the hull of a boat, such as the hull 22. When the suction ring 18 is applied to the hull 22 in this manner the inner and outer suction rings 48 and 50 seal the suction portion 52 from air in the interior and on the exterior of the housing 12, respectively, to releasably secure the suction ring 18 to the hull 22. Also integrally molded in the suction ring 18 is an eye 54 to which the safety cord 20 is attached.

The safety cord 20 is illustrated in FIGS. 1 and 2 and it includes an elongated flexible cord element 56 and a clip 58. The cord element 56 comprises a flexible cord of a suitable length and it is received in the eye 54 and secured with a knot 60. The clip 58 comprises a conventional clip, such as an alligator-type clip, and it is securable to a convenient portion of a boat, such as the rub rail 30 for retaining the alarm 10 against falling into the water in the event that the suction ring 18 inadvertently becomes disengaged from the boat hull 22 during a fueling operation.

Accordingly, for use and operation of the alarm 10 the suction ring 18 is placed in engagement with the hull 22 around the fuel vent 24 and the housing 12 is urged toward the hull 22 to evacuate the suction portion 52. Once the suction portion 52 has been evacuated in this manner, the suction ring 18 is operative for releasably retaining the alarm 10 in sealing engagement with the hull 22 around the vent 24. As a result, any air passing outwardly through the vent 24 as a fuel tank connected to the vent line 26 is filled passes into the housing 12 and outwardly through the apertures 42 in the disks 40. In this regard, during a normal fueling operation the amount of air passing outwardly through the vent 24 is reduced substantially when the fuel tank associated with the vent 24 approaches a substantially full condition and it is further reduced to a minimal level when fuel begins to back up into the vent line 26. As a result, when the fuel tank approaches a substantially full condition, the pitch of the whistling sound produced by the whistle element 14 is lowered substantially to provide an indication that the fuel tank is substantially full. Further, when the fuel tank reaches a full condition so that fuel begins to back up into the vent line 26, the whistling sound stops to provide an indication that the tank is full. Accordingly, an operator engaged in a fueling operation can normally shut off the flow of fuel to a boat in time to prevent fuel from spilling through the vent 24. However, even if a small amount of fuel does inadvertently pass outwardly through the vent 24, it is normally received in the housing and then passes into the retainer 16 so that it is not wasted and does not spill onto the surface of a waterway to create an environmentally hazardous condition.

It is seen therefore that the instant invention provides an effective fuel filler alarm for boats. The alarm 10 can be effectively and easily secured to the hull 22 of a boat so that air passing outwardly through a vent 24 thereon during a fueling operation must pass through the whistle element 14 to produce a whistling sound, which whistling sound stops when the associated fuel tank reaches a full condition. As a result, it is possible to easily determine when the fuel tank associated with the vent 24 has reached a full condition so that the fueling operation can be terminated before a fuel spill occurs. Further, even if a small quantity of fuel does pass outwardly through the vent 24 during the fueling operation, the fuel is contained in the retainer 16 so that it may be reintroduced into the boat's fuel system without causing an oil spill on the surrounding waters. Accordingly, for these reasons as well as the other reasons hereinabove set forth it is seen that the fuel filler alarm of the subject invention represents a significant advancement in the art relating to boating accessories.

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed:

1. A fuel filler alarm for a boat comprising whistle means operable in response to an air stream passing through a fuel tank vent on an exterior hull surface of the boat during a fueling operation for producing an audible sound, a housing having an aperture therein, said whistle means being received in said aperture, securing means for detachably securing said housing to the hull of said boat so that said housing encircles said vent causing air passing through said vent to pass through said housing and outwardly through said whistle means to produce an audible sound and receiver means on said housing for receiving and containing fuel spilled from said vent, said receiver means being detachable from said boat hull with said housing.

2. In the fuel filler alarm of claim 1, said receiver means being detachable from said housing for draining fuel from said receiver means.

3. The fuel filler alarm of claim 1 further comprising safety cord means releasably securable to said boat for retaining said housing and said whistle means against falling into the water in the event that said securing means becomes disengaged from said boat.

4. A fuel filler alarm for a boat comprising whistle means operable in response to an air stream passing through a fuel tank vent on the hull of the boat during a fueling operation for producing an audible sound, mounting means for releasably mounting said whistle means on said boat so that air passing through said vent during said fueling operation passes through said whistle means to produce an audible sound, receiver means on said housing for receiving and containing fuel spilled from said vent, said receiver means being detachable from said housing for draining fuel from said receiver means.

5. A fuel filler alarm for a boat comprising whistle means operable in response to an air stream passing through a fuel tank vent on the hull of the boat during a fueling operation for producing an audible sound, a housing having an aperture therein, said whistle means being received in said aperture, and suction seal means for releasably securing said housing to the hull of said boat with a suction seal adjacent said vent so that air passing through said vent passes through said housing and outwardly through said whistle means to produce an audible sound.

6. In the fuel filler alarm of claim 10, said suction seal securing means comprising an elastomeric suction ring including inner and outer seal portions and a concave suction portion between said seal portions, said inner and outer seal portions being sealingly engageable with said hull to seal said suction portion from air in the interior of said housing and air on the exterior of said housing, respectively, said suction ring being resiliently deformable to evacuate said suction portion and to thereby releasably secure said suction ring to said hull.

7. The fuel filler alarm of claim 6 further comprising receiver means on said housing for receiving and containing fuel spilled from said vent.

* * * * *